Figure 1:
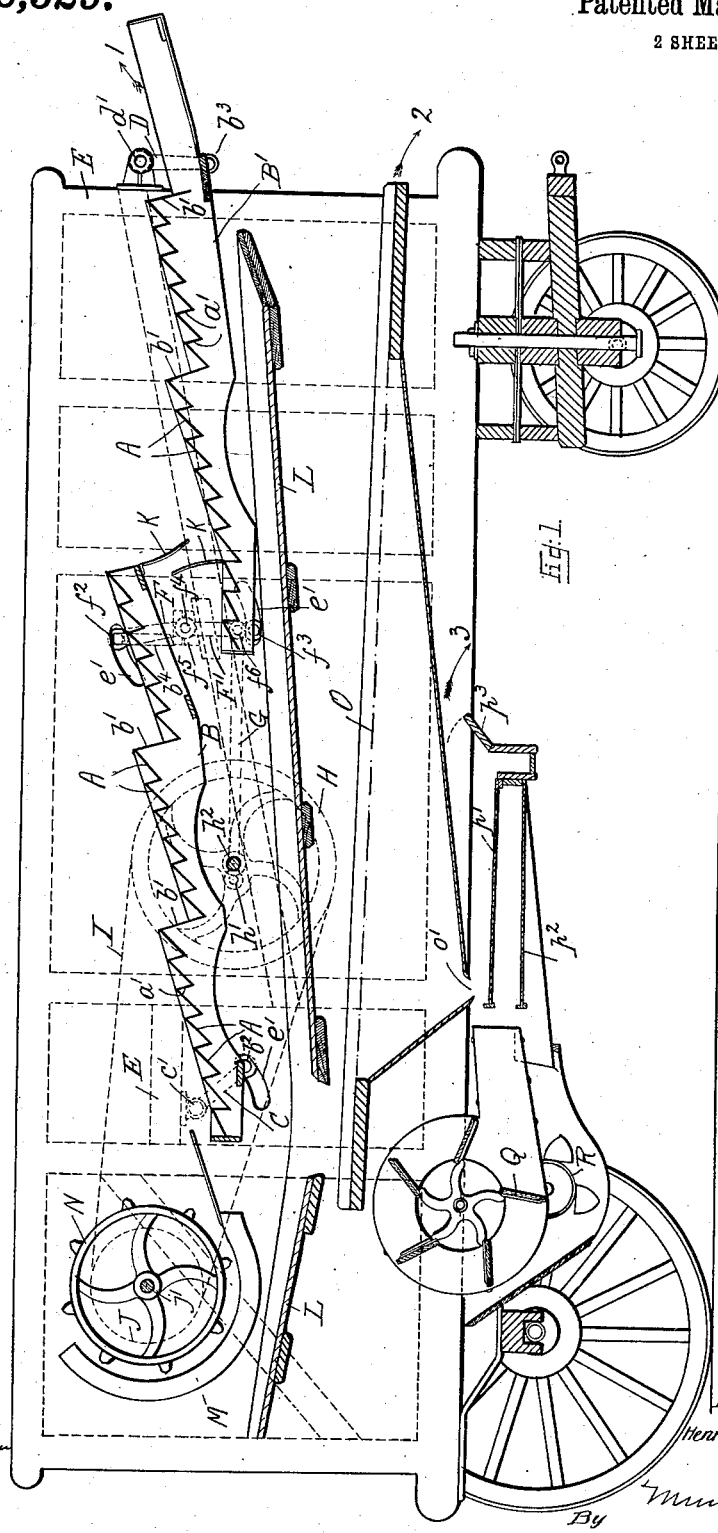

H. S. RAINFORTH.
RIDDLING APPARATUS FOR SEPARATING STRAW, CAVINGS, CHAFF, AND THE LIKE FROM GRAIN OR SEEDS.
APPLICATION FILED OCT. 8, 1910.

1,026,529.

Patented May 14, 1912.
2 SHEETS—SHEET 1.

Witnesses
Inventor
Henry S. Rainforth
By Attorneys

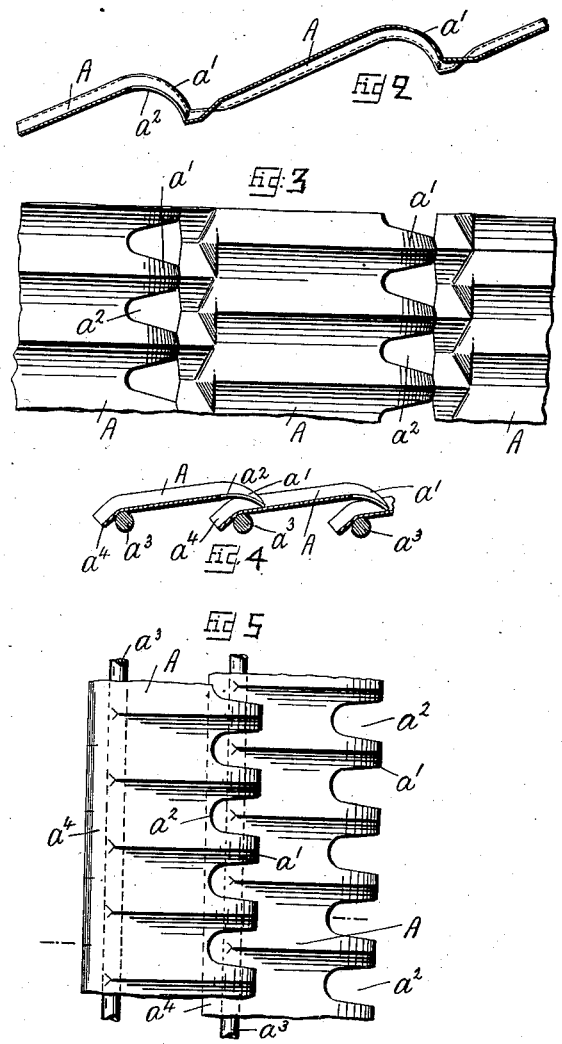

UNITED STATES PATENT OFFICE.

HENRY SLACK RAINFORTH, OF LINCOLN, ENGLAND.

RIDDLING APPARATUS FOR SEPARATING STRAW, CAVINGS, CHAFF, AND THE LIKE FROM GRAIN OR SEEDS.

1,026,529.     Specification of Letters Patent.    Patented May 14, 1912.

Application filed October 8, 1910. Serial No. 586,016.

*To all whom it may concern:*

Be it known that I, HENRY SLACK RAINFORTH, a subject of the King of Great Britain and Ireland, and a resident of Lincoln, England, have invented certain new and useful Improvements in Riddling Apparatus for Separating Straw, Cavings, Chaff, and the Like from Grain or Seeds; and I do hereby declare the following to be a full, clear, and exact description of the same.

This invention relates to improvements in and connected with sieves or screens for use in threshing machines, for separating straw, cavings, chaff, and the like, from grain, and seed.

The invention has for its object to obtain a more effective separation.

According to the present invention, the sieve is made with slats or sections, corrugated from back to front and formed with downturned forward ends. At such ends, the slats or sections are formed with recesses which in adjacent slats or sections are arranged alternately or in staggered formation. The slats or sections may be stationarily or pivotally mounted in relation to the sieve frame, and in the latter case have both their forward and their rearward ends downturned. By these means a better separation of the straw from the grain is obtained, and when air blast is used a better distribution of the air-currents across the width of the sieve is effected. The slats or sections are preferably placed on stepped frames which are suitably supported at a slight inclination and are given a long forward and backward movement in their inclined direction, which produces a very effective separating action. Preferably a plurality of frames is mounted in the machine so as to overlap one another and they are moved simultaneously in opposite directions to act more violently on the straw.

The invention is illustrated in the accompanying drawings, in which:—

Figure 1 represents a sectional elevation of sufficient of a threshing machine to enable the application of the present invention to be readily understood; Figs. 2 and 3 represent sectional and plan views of a sieve composed of corrugated slats or sections having their forward ends downturned; Figs. 4 and 5 represent sectional and plan views of two pivotally mounted slats or sections having both their forward and their rearward ends downturned.

Referring to the drawings, the sieves are formed of slats or sections, A, which are downturned at their forward ends, $a^1$. The slats may be connected together, as shown in Figs. 1 to 3, by being stamped from sheet metal. Or, referring to Figs. 4 and 5, the slats may be mounted on cross rods, $a^3$, pivotally supported at the sides of the sieve frames, and adapted to be partly rotated in any convenient manner to adjust the mesh of the sieve. In this case, the slats have both their forward ends, $a^1$, and their rearward ends, $a^4$, downturned, and the furrows of the downturned rearward parts lie in line with the ridges of the main parts of the slats.

$a^2$ are apertures formed through the downturned forward ends or recesses formed in the downturned forward ends of the slats to form passages for the grain, and for the air blast if used, to pass through. The apertures, $a^2$, in adjacent slats are arranged alternately so as to break-joint with one another so that a better separating action is obtained as aforesaid. The slats are made of a corrugated formation from back to front, as shown in Figs. 3 and 5. The corrugations in adjacent slats are arranged alternately, so that the ridges of the corrugations of one slat lie in line with the furrows of the corrugations of the adjacent slats. The downturned forward ends are preferably of a curved formation as shown in Figs. 2 and 4, but may be straight as shown in Fig. 1.

B, $B^1$ represent the frames on which the slats are supported. These frames are formed with stepped sides, $b^1$, each step supporting a series of slats, or sieve sections, so that the straw is subjected to a better separating action in passing over the sieve or shaker. The frames are arranged at a slight inclination, one in front of the other, and so that the inner end of one sieve overlaps the inner end of the other so as to form as it were one continuous stepped sieve from end to end. The front frame, B, is pivotally connected at its fore end, by a pin, $b^2$, to a link, C; and the rear frame, $B^1$, is pivotally connected at its rear end, by a pin, $b^3$, to a link, D. The links, C, D, are pivotally supported by the machine frame, E, as at $c^1$, and $d^1$, respectively. The front frame, B, at its rear end is provided with a bracket, $b^4$, which is pivotally connected at its upper end, by a pin, $f^2$, to the upper arm, F, of a double link; and the rear frame, B, at its front end, is pivotally connected by a pin, $f^3$, to the lower arm, $F^1$, of the double link. The arms, F, $F^1$, of the double link are mounted upon a short spindle, $f^4$, supported in a bearing, $f^5$, arranged between the arms, on the machine frame. The lower arm, $F^1$, is pivotally connected as at $f^6$, to a connecting rod, G, connected to a crank pin, $h^1$, on a fly wheel, H, arranged in advance of the rear frame, $B^1$. The pins, $b^2$, $f^2$, $f^3$, pass through arc-like slots, $e^1$, in the side of the machine frame, E, which accommodate their movement. By these means, when in operation the frames are reciprocated and caused to move in opposite directions at the same time, which besides obtaining a better separating effect aids in balancing the apparatus.

If desired, the arms, F, $F^1$, may be of a shorter radius than the links, C, D, as this construction gives a peculiarly effective combined oscillating and reciprocating motion to the frames. The distance of the pins, $f^2$, $f^3$, from the center, $f^4$, may be made adjustable to enable the throw of the frames to be regulated, if desired.

Supporting and driving means as above described are arranged on each side of the machine, and both fly wheels are mounted on one main driving shaft, $h^2$, extending across the machine. The fly-wheel on one side is adapted to be driven by a band, I, from a pulley, J, on the drum spindle, $j^1$.

L represents the top shoe or collecting tray for the grain and chaff passing through the concave, M, of the drum, N, and through the shaker sieves, A, from which the straw is ejected in the direction indicated by the arrow 1.

O represents the caving riddle, actuated in known manner, through which the grain and chaff pass and from which the cavings pass in the direction indicated by the arrow, 2.

$p^1$, $p^2$, represent dressing sieves of different mesh and of large area, and arranged so that the blast from the blower, Q, acts on the chaff and seed as it falls through the opening, $o^1$, in the inclined bottom of the caving riddle, and also acts by blowing through the upper sieve, $p^1$. The chaff is blown out in the direction indicated by the arrow, 3, over the wind-board, $p^3$, and the grain passes in a roughly cleaned condition into the well of the corn elevator, R.

What I claim as my invention and desire to secure by Letters-Patent is:—

1. A sieve for use in a threshing machine comprising a plurality of corrugated screening members, the corrugations in adjacent members being arranged alternately, so that the ridges of the corrugations of one member lie in line with the furrows of the corrugations of the adjacent members.

2. A sieve for use in a threshing machine comprising a plurality of corrugated screening members having their forward ends downturned, the corrugations in adjacent members being arranged alternately.

3. A sieve for use in a threshing machine comprising a plurality of corrugated screening members having their forward ends downturned and provided at their forward ends with apertures arranged alternately in adjacent members, the corrugations in adjacent members also being arranged alternately.

4. A sieve for use in a threshing machine comprising a plurality of corrugated screening members having their forward ends downturned and their rearward ends downturned, the furrows of the downturned rearward parts lying in line with the ridges of the main parts of the members.

In testimony whereof I affix my signature, in presence of two subscribing witnesses.

HENRY SLACK RAINFORTH.

Witnesses:
 WRIGHT HOLMES,
 CHARLES BLADES.

---

Copies of this patent may be obtained for five cents each, by addressing the "Commissioner of Patents, Washington, D. C."